July 9, 1929.  A. S. ALEXANDER  1,719,821
REAR VIEW MIRROR BRACKET
Filed June 20, 1928
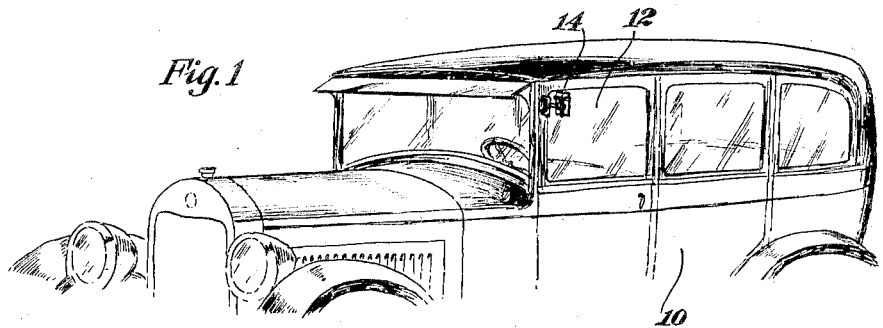
Fig. 1
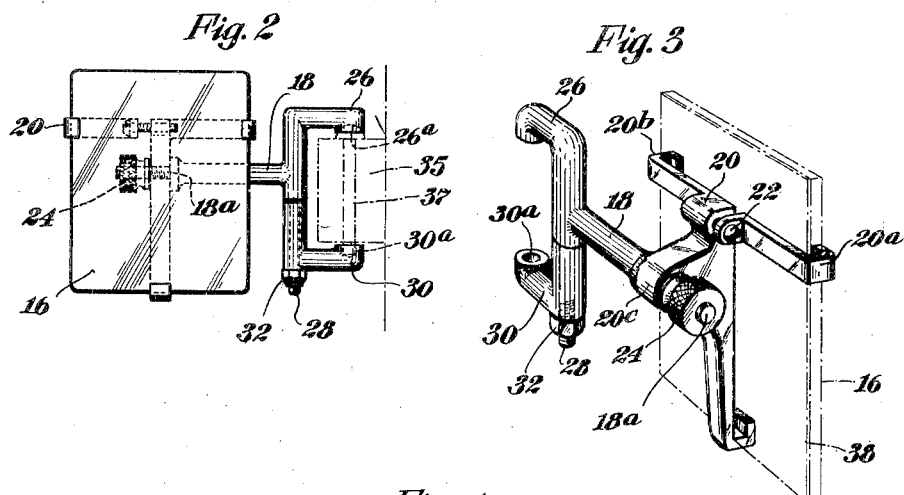
Fig. 2
Fig. 3
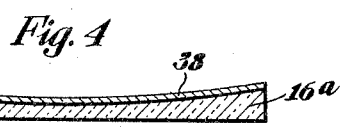
Fig. 4
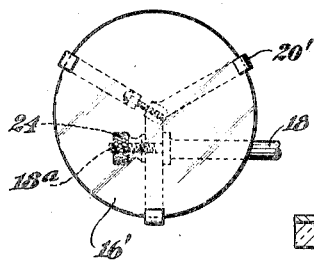
Fig. 6
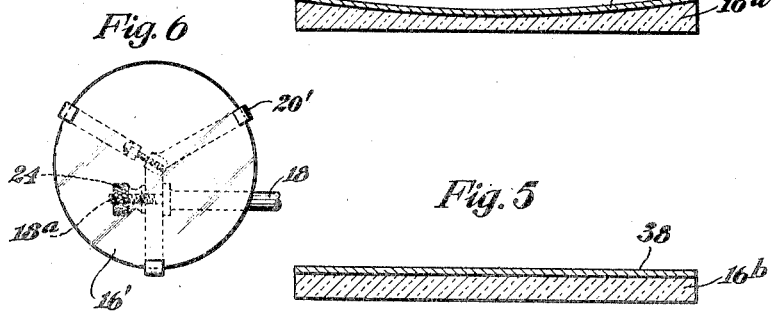
Fig. 5
INVENTOR
*Arthur S. Alexander*
BY
*Hammond & Littell*
ATTORNEYS Patented July 9, 1929.

1,719,821

UNITED STATES PATENT OFFICE.

ARTHUR S. ALEXANDER, OF BROOKLYN, NEW YORK, ASSIGNOR, BY MESNE ASSIGNMENTS, TO ALEXANDER & McGRATH, INC., AND NASSAU BRASS FOUNDRY, INC., OF BROOKLYN, NEW YORK, CORPORATIONS OF NEW YORK.

REAR-VIEW MIRROR BRACKET.

Application filed June 20, 1928. Serial No. 286,939.

This invention relates to improvements in rear-view mirrors and their attachment on automobiles or similar vehicles, and more particularly relates to the means for attaching such rear-view mirror to a door hinge on the door forward of the driver.

It is the object of my invention to provide a satisfactory outside rear-view mirror which can be easily and quickly applied to the automobile without any change in the automobile structure and without the necessity for the use of complicated tools or the like.

Another object of this invention is to provide a bracket for rear-view mirrors which may be attached to the hinge pin in the upper front door hinge of an automobile so that the mirror is always in position to reflect rear-view traffic conditions.

It is another object of this invention to provide a securing means for attaching a rear view mirror adjacent the upper front corner of a motor vehicle body, without deforming or altering the body to permit observation of rear traffic conditions.

It is still a further object of this invention to provide means for supporting a mirror on a hinge of a vehicle door.

Further objects and advantages of this invention will appear from the following description, together with the attached drawings illustrating the preferred form of embodiment thereof, and in which Figure 1 is a perspective view of a closed automobile body having a mirror attached thereto, in accordance with this invention.

Figure 2 is a front elevation of the mirror and attaching bracket showing a hinge and hinge pin in dotted outline.

Figure 3 is a perspective view of the rear of the bracket shown in Figure 2.

Figure 4 is a transverse cross section of a concave mirror and backing plate.

Figure 5 is a transverse cross section of a plane surface mirror similar to Figure 4, and Figure 6 is a front elevation on a reduced scale of a round mirror.

The motor vehicle 10, shown in Figure 1, is of the customary present-day sedan or closed type and is provided with the customary front door 12 through which the operator may observe rear traffic conditions as reflected in the mirror 14. This mirror is provided with a reflecting surface 16 which may have either a concave surface, as shown at 16ª in Figure 4, or the usual plane surface 16ᵇ as shown in Figure 5, the only difference being that the plane mirror reflects directly, where the concave mirror concentrates the image of the traffic condition thereon. The backing plate 38 is also provided to reinforce the support for the mirror and it may preferably be suitably plated to improve the appearance of the mirror. It is desirable that these backing plates cooperate with the curved portion of the mirror, so that the exposed surface is flat.

The mirror 16 is supported by a bracket 18 which is comprised of a central horizontal extending axis 18ª on which the mirror clamp 20 is secured. As more clearly shown in Figure 3, the rear mirror clamp is of any desired form having mirror retaining grips 20ª and 20ᵇ, the grip 20ª being adjustable by means of the screw 22 so that various sized mirrors may be securely fastened thereto. The outstanding boss 20ᶜ integral with the grips 20ᵇ of the clamp 20 is adapted to pivotally receive the shank of the axis 18ª and a knurled nut 24 screw threaded on the end of the 18ª will retain the mirror supporting clamp in adjusted position on the bracket 18.

The other end of the bracket 18 is provided with an upwardly and outwardly projecting end 26 of inverted L-shape, having a downwardly opened recess 26ª therein. The bracket is also provided with a downwardly projecting portion 28, forming the extension of the inverted L and suitably reduced to receive an L-shaped arm 30 pivotally supported thereon. The end of this L-shaped piece is also suitably recessed at 30ª, which opens upwardly for a purpose to be hereinafter shown. A nut 32 screw threaded on the end 28 of the bracket 18 is adapted to force the lower L-shaped projection against the upper inverted L-shaped end which in effect forms a square C clamp with the extended projection 18ª substantially centrally secured thereto.

The front door 12 of the vehicle 10 is hinged by the hinge 35 having the pin 37 non-rotatably secured in the butt attached to the door jamb. The upper end of this pin 37 has the usual crown over which the recess 26ª in the bracket 18 securely fits. The lower extension of the pin 37 projects below the butt of the hinge 35 and extends into the recess 30ᵃ in the lower L-shaped extension 30 of the bracket 18.

It will thus be seen that by adjustment of the nut 32, the lower L-shaped portion of the bracket 30 may be forced upward to cooperate with the upper extension 26 of the bracket to force the ends thereof in contact with the hinge pin. As the hinge pin does not rotate, no matter whether the door is moved or not, it is a fixed support for the mirror and the mirror may be permanently secured in place thereto. The nut 32 provides for angular movement in one plane, and the knurled nut 24 provides for angular movement in the other plane. The operator may adjust the mirror in this manner in order to clearly observe conditions to the rear of the vehicle, and the mirror is outside of the vehicle and not subject to steaming glass or drawn curtains or internal reflections or any other objections.

A slightly modified form of mirror retaining clamp 20′ is shown in Figure 6 adapted to receive a circular mirror 16′. It is only essential however, with different shaped mirrors to space the grips that the mirror will be properly secured and the adjustment may be made by adjustably securing any one of the three to the other two. The remaining parts of the bracket will obviously be suitable no matter what the mirror shape and whether the concentrating concave mirror or the plane mirror is used. With the concave mirror, the entire traffic condition that has any importance will be disclosed therein.

It is possible that in some vehicles the hinge pin may be secured to the movable half of the hinge so that when the door opens, the mirror will open with it. Under such circumstances, it will be necessary to secure the pin permanently to the movable half of the hinge in order that when the door closes the mirror will again be in the proper focused position. The important point however, is that no matter which type is used, the mirror does not extend sufficiently far beyond the side of the vehicle, to be struck and does not in any way interfere with the opening of the door. It is unobtrusive, out of the way, and yet highly convenient, easily adjusted and always available.

This mirror is adapted to be attached to a door hinge without the requirement of tools and does not necessitate extensive changes or, in fact, any changes being made in the vehicle body. The usual hinge and hinge pin is used and removal or changing of the hinge pin is unnecessary. It is an accessory which is compact in form and which will successfully satisfy the condition for which constructed, namely, that of reflecting rear-view positions accurately and permanently without being subject to vibration or any other disturbance of adjustment, or any interference due to adverse driving conditions.

While I have shown and described the preferred form of embodiment of this invention, I am well aware that other modifications may be made and I, therefore, desire a broad interpretation of the invention within the scope and spirit of the disclosure herein and the claims appended hereto.

I claim:

1. In combination with a door of a closed automobile body with the usual hinge forward thereof having the usual hinge leaves and hinge pin, a rear-view mirror, and a bracket secured to said mirror, said bracket comprising a yoke having recessed sockets adapted to receive the ends of the hinge pin and means to clamp the yoke over the ends of the hinge pin.

2. A mirror bracket for a door hinge of the class described, comprising a rigid inverted L-shape portion having a downwardly opening recess therein, a second rigid L-shaped portion removably and telescopically secured to said inverted L-shaped portion to form a C-shaped clamp, and having an upwardly opening recess therein, said clamp receiving the ends of the usual hinge pin in said recesses, and means to secure a mirror adjustably to the bracket.

In testimony whereof I have affixed my signature to this specification.

ARTHUR S. ALEXANDER.